United States Patent Office 2,938,812
Patented May 31, 1960

2,938,812
TREATED GLASS FIBERS AND COMPOSITIONS FOR USE IN SAME

Alfred Marzocchi, Pawtucket, and Remus F. Caroselli, Manville, R.I., assignors to Owens-Corning Fiberglas Corporation, Toledo, Ohio, a corporation of Delaware No Drawing. Filed Apr. 21, 1954, Ser. No. 424,787

5 Claims. (Cl. 117—126)

This invention relates to a composition for use with fibers as a size, binder or coating to improve the processing and performance characteristics of the fibers and to improve the finish on the fibers in fabric form. While the invention has application particularly to the use with glass fibers and will hereinafter be described most specifically in application thereto, the compositions may be used to advantage with other fibers such as cotton, wool, silk, jute and other natural vegetable and animal fibers or with synthetic fibers such as the polyesters (Orlon, Dacron, Dynel), polyamides (nylon), cellulose esters (rayon) and the like, particularly with respect to the soil releasing properties and improvement in the abrasion resistance of such treated fibers.

It is an object of this invention to produce a new and improved composition for use as a size, binder or finish for fibers and it is a related object to produce fibers treated with same.

Another object of this invention is to produce a composition which may be used with fibers as a size in forming to improve the performance and processing characteristics of the fibers when formed into yarns, mats, fabic and the like and to improve the finish of the fibers and the fabrics formed thereof.

A further object is to produce a composition for use with glass fibers either as a size for application to the fibers in forming, as a size for application to the fibers after the original size has been removed and the fibers formed into a fabric or as a finish for application onto the glass fibers after they have been formed, and it is a related object to produce a composition of the type described which is capable of use to improve both the processing and performance characteristics of the fibers.

A still further object is to produce a composition for use in the treatment of fibers, both natural and synthetic, organic and inorganic, to improve the abrasion resistance of the fibers and their ease of cleaning without deterioration of the other properties.

For the most part, glass fibers are unlike others of the natural and synthetic organic fibers particularly from the standpoint of abrasion resistance, printing and coloring, and anchorage of various types of resinous binders, lubricants and the like to the surfaces of the fibers as in the processing of the glass fibers into strands, yarns and fabrics or in the use of the fibers as a reinforcement in the manufacture of reinforced plastics and coated fabrics.

Natural fibers, such as cotton, wool, jute and the like, are relatively porous and they are also characterized by a high degree of surface roughness. As a result the treating materials are able to penetrate into the fibers and anchor onto the surfaces thereof so that a bonding relation with the various lubricants, binders and size compositions can be achieved without difficulty purely by physical forces. While synthetic organic fibers are relatively free of pores of the type existing in the natural fibers, and while they have a relatively smooth surface, the synthetic organic fibers are formed of resinous polymers which are generally highly receptive to other organic substances which are present in a size, lubricant or binder and the materials of which the fibers are formed are capable of being softened by solvents or by heat to enable a strong bonding relation to be established both by physical and by chemical forces.

Glass fibers, on the other hand, are neither porous nor characterized by surface roughness to enable bonding by physical forces and they are not organophilic or subject to softening or attack by solvents in the treating composition or heat so that attachment by the other forces employed with synthetic organic fibers are not available. Instead, the glass fibers are non-porous rod-like members having perfectly smooth surfaces which are highly hydrophilic in character and are therefore preferentially receptive to moisture to the extent that a film of a resinous binder or size on the glass fiber surfaces will be preferentially displaced by a water film in the presence of high humidity.

Because of the exceptionally high strengths of the glass fibers and because of their incombustibility and their resistance to deterioration or attack by fungus, by bacteria or by elements normally existing in the atmosphere, and because of their good electrical and heat insulation properties, it is most desirable to be able to make use of glass fibers in structures in which maximum utilization can be made of these desirable properties in fabrics formed thereof. If a strong bonding relation cannot be established and maintained between the glass fibers and the resinous materials with which they are combined, the glass fibers are incapable of imparting their full effect to increase the strength properties of the structure that is formed. If a permanent tie-in between the glass fibers and the coating materials or coloring agents on the glass fiber surfaces cannot be established, it becomes possible to displace the coating or coloring agent from the glass fiber surfaces, particularly under high humidity conditions, as in washing and laundering.

Unlike the great majority of other fibers, glass fibers are subject to deterioration or destruction by mutual abrasion or by abrasion with other surfaces unless the glass fiber surfaces are protected and it therefore becomes important to treat the glass fibers in forming and afterwards to maintain a protective coating on the glass fiber surfaces with materials which are strongly receptive to the glass fiber surfaces and preferably anchored thereto sufficiently strongly to resist displacement under high humidity and which provides the desired processing characteristics to enable the glass fiber filaments to be formed into strands, yarns and fabrics and other fibrous structures and which provides the desired performance characteristics to enable utilization of the glass fibers as a textile material or fibrous structure or in combinations with resinous materials and binders in the manufacture of reinforced plastics and coated fabrics.

Usually the development of the desired processing characteristics is achieved by the treatment of the glass fibers with one type of composition embodied in a size applied to the glass fiber surfaces in forming and the desired performance characteristics are developed in a separate operation with a different material applied to the glass fiber surfaces after the previously applied size has been removed. The ideal condition would be found to exist in a single composition, and preferably in a single material applied to the glass fiber surfaces to provide the desired processing and performance characteristics which would enable maximum utilization of the properties of the glass fibers and which could be used advantageously as a finish for the glass fibers in a fabric and provide a colorable base when the fabric is used as a textile material, and it is an object of this invention to produce and to provide a method for producing same.

Modification of the glass fiber surfaces for conversion from a hydrophilic surface that is preferentially receptive to water into a surface which is highly receptive to organic materials such as are present in organic size compositions, binders, coatings and finishing materials has been achieved in the past by the treatment of the glass fibers with a Werner complex compound having an acido group coordinated with the trivalent nuclear chromium atom which is capable of strong coordination with the groupings that exist on the glass fiber surfaces. When, as described in the Iler Patents No. 2,273,040 and No. 2,356,161, the acido group is formed of an aliphatic organic group containing more than 10 carbon atoms, the Werner complex compound anchored onto the glass fiber surfaces provides lubricity for protecting the glass fibers and to improve their processing characteristics. When, as described in the Steinman Patent No. 2,552,910, the acido group contains a highly functional group or an alpha unsaturated carbon to carbon linkage, the Werner complex compound functions as an anchoring agent which renders the glass fiber surfaces highly receptive to organic resinous coatings, binders and finishing materials.

More recently, it has been found that a strong bonding relation can be established with the glass fiber surfaces through a silicon oxide bond between an organo silicon compound and the silicon oxide groupings in the glass fibers. When, as described in the Steinman Patent No. 2,563,288, the organo silicon contains unsaturated organic groups of low carbon length or highly functional groups, the organo silicon attached to the glass fibers functions as an anchoring agent which renders the glass fiber surfaces more receptive to certain resinous binders, coatings and finishing compositions. In the copending application Ser. No. 221,512 of Biefeld, description is made of the use of a water soluble polysiloxanolate which may be safely applied to the glass fiber surfaces in forming from a water solution and which becomes insolubilized on the glass fiber surfaces upon drying to function as an anchoring agent which renders the glass fiber surfaces more highly receptive to various treating materials.

It has now been found by way of further improvement in the methods of treating glass fibers to modify the characteristics thereof that treatment of the glass fiber surfaces may be achieved by a system which is substantially unlike those which have heretofore been employed and which offers the flexibility in operation that enables treatment of the glass fibers in forming or afterwards to improve their processing characteristics, their performance characteristics, or simultaneously to improve both their processing and performance characteristics in a single operation and with a single material and which may also be used as a finish for the glass fibers and for other natural and synthetic fibers in fabric form to improve their abrasion resistance and dirt releasing properties and the like.

The desired characteristics are developed on the surfaces of the glass fibers in accordance with the practice of this invention by treatment of the glass fibers to deposit a complex of a titanium ester on the glass fiber surfaces. The reaction to anchor the complex on the glass fiber surfaces is believed to be based upon the ability of the titanium ester, preferably the titanium tetraester, to form a complex compound by reaction with compounds containing hydroxy and/or amino groups and in which the hydroxy groups on the glass fiber surfaces become capable of complexing to tie in the titanium compound onto the glass fiber surfaces. When the complex is formed by reaction of the titanium tetraester with amines or polyamines, or hydroxy amines, or alcohols, glycols or other polyhydric alcohols and the like, the complex that is formed appears to be able to coordinate fully with the surfaces of the glass fibers either by a similar type of complexing action between the complex and the hydroxy groups that are available on the glass fiber surfaces or by other available ionic or molecular forces. In any event, the complex formed on the glass fiber resists displacement from the glass fiber surfaces even under high humidity conditions which have heretofore caused a water film preferentially to form on the glass fibers.

As the titanium ester, use is preferably made of the ortho esters such as tetraethyl titanate, tetramethyl titanate, tetrapropyl titanate, tetrabenzyl titanate and the like. It is preferred to make use of the lower organic alcohols as the ester forming group but the corresponding acids may be used to form the tetraalkoxy titanate for purposes of producing a complex which is soluble or readily miscible in aqueous medium in the treatment of glass fibers. When the ester forming group comprises an organic group of high carbon length, such as is formed of fatty acids and alcohols having more than 10 carbon atoms, lubricity is developed on the glass fiber surfaces but the titanate becomes less soluble in water so that it becomes necessary either to make use of the material in a solvent solution or aqueous dispersion in the treating composition. For example, lubricity is imparted to the glass fiber surfaces when the tetraalkyl titanate is formed of such fatty acids and alcohols as stearic acid, palmitic acid, oleic acid, linoleic acid, myristic acid, lauric acid and the like.

When the ester forming group of the titanate contains an unsaturated carbon to carbon linkage or when it is formed of groupings containing a highly negative group, a labile hydrogen atom, or a highly polar group or other functional group, defined in the Steinman Patent No. 2,552,910, the complex that is formed on the glass fiber surfaces is capable also of functioning as a strong anchoring agent to render the fibers highly receptive to resinous materials formed of addition polymerization through unsaturated carbon to carbon linkages or other resinous and treating materials of the type defined in the aforementioned Steinman Patent No. 2,552,910. These include the esters which are formed of such compounds as allyl alcohol, vinyl alcohol, allyl acetic alcohol, furfuryl alcohol and the like, and their acids. When the long chain fatty acid ester of the titanate is formed with unsaturated carbon to carbon linkages such as form oleyl alcohol, linoleyl alcohol and the corresponding acids, the titanate provides both lubricity and bonding.

The tetralkyl titanates have been found to be highly reactive with amines and alcohols and with hydroxy amines, such as ethanolamine, diethanolamine, triethanolamine and the like to form complex compounds which are capable of further complexing with groups on the glass fiber surfaces or orientation therewith. By proper selection of the amines, polyamines, hydroxyamines or hydroxy compounds, the complex may be adapted for use as a lubricant, size, protective coating, finishing coating or anchoring agent on the fiber surfaces. When the amine is monomolecular and formed with a long chain having more than 10 carbon atoms, such as fatty acid amine of oleic acid, linoleic acid, palmitic acid, caproic acid, lauric acid and the like, the complex formed on the glass fiber surfaces imparts lubricity to the glass fibers and improves the processing characteristics thereof. When the amine or hydroxy compound complexed with the titanium ester is formed with short chained organic groups, the coating that is formed on the surfaces of the fibers becomes less flexible and harder and may require the combination with a separate lubricant when used as a size but it can be used alone or in combination with other materials to modify the fiber surfaces for increasing the abrasion resistance and to provide a receptive base for the application of other resinous binders, bonding agents, textile dyestuffs and coloring compositions. When the amines or hydroxy compound complexed with the titanate are formed of organic groups having less than 7 carbon atoms in straight chain arrangement and when they contain a highly functional group such as a labile hydrogen atom, a highly polar group, a highly negative group or an alpha unsaturated carbon to carbon linkage of the types described in the aforementioned Steinman patent, the complex compound insolubilized on the glass fiber surfaces functions as an anchoring agent to render the glass fiber surfaces highly receptive to organic materials.

In addition to the ability to form a complex compound of the type described for use as a size or as a component of a size or as an anchoring agent on the glass fiber surfaces, the concepts forming an important part of this invention enable the preparation of a complex compound which embodies film forming characteristics capable of developing a strong bonding relation with the glass fiber surfaces to impart improvements in the protection of the fiber surfaces and the processing and performance characteristics thereof.

In accordance with the practice of this invention, the complexing reaction with the titanium tetraester is carried out with a film resinous material having free hydroxy or amino groups such for example as with polyvinyl alcohol or polyvinylpyrollidone. The resinous polymers form a complex with the titanium tetraester which is capable of further complexing or orientation to develop a strong bonding relation, as previously described, with the glass fiber surfaces in the manner to coat the glass fibers with a single composition heretofore requiring two separate and usually incompatible components, such as a lubricating oil and a resinous binder for protection, neither of which are capable of a strong bonding relation with the fibers. The molecular weight of the polyvinyl alcohol or of the polyvinylpyrollidone may be varied as desired to provide the desired characteristics, ranging from a soft but tough coating when polymers of low molecular weight are employed to a hard and tough coating formed of polymers of high molecular weight.

Thus the titanium complexes may be formed of monomolecular substances to improve the processing characteristics of the glass fibers when formulated of organic groups having more than 10 carbon atoms either in the ester or in the complexing groups, to improve the performance characteristics for rendering the surfaces of the glass fibers more highly receptive to resinous materials in the manufacture of colored fabrics, reinforced plastics and coated textiles when formulated of groups having highly functional groups or unsaturated carbon to carbon linkages in the ester or complexing groups, or to improve both the processing and performance characteristics when formulated with a polymer as the complexing group. The titanium itself, having a number of reactive positions available for ester formation and for complexing, may be used to achieve the build-up of molecules into compounds of higher molecular weight and in which variation in solubility and film forming properties may be developed by cross linking.

It is unnecessary to make use of the complexing titanium esters in the theoretical amounts to produce a complex in the treatment of glass fibers or other fibers. In forming the ortho esters, less than four positions may be occupied by the ester groups, but it is preferred to make use of the tetraester for complexing. It is believed that as many as four amino or hydroxy groups of the complexing amines, polyamines, hydroxyamines, alcohols, polyglycols or the like may be taken in to form the complex with the titanium ester but it is preferred to make use of less than four such groups and to leave some of the complexing positions open for further complexing with groups that exist on the fiber surfaces. In practice, use is made of 2–3 molecules of the amine, alcohol or hydroxyamine per titanium tetraester in forming the complex.

The following will represent compositions embodying features of this invention for use as a composition for treating glass fiber:

*Example 1*

45.6 parts by weight beta-amino ethoxy titanium cocoanut acylate (2% solution)
6.8 parts by weight imidazolene stearate cationic compound
2220 parts by weight water
5 cc. acetic acid

*Example 2*

3 parts by weight octylene glycol triethanolamine titanate
0.3 part by weight Warco amine No. 1 (imidazoline stearate solubilized with acetic acid)
96.7 parts by weight water

*Example 3*

2.0 parts by weight titanium lactate
5.0 parts by weight polyvinyl alcohol
4 cc. acetic acid
0.5 part by weight tetraethylene pentamine wetting agent
93 parts by weight water

*Example 4*

3 parts by weight allyl ethoxy titanate
0.5 part by weight cationic amine wetting agent
96.5 parts by weight water The complex of Example 2 is prepared by reaction of tetraethoxy titanate with 2 molecules of octylene glycol and 1 molecule of triethanolamine. The ester of Example 3 is prepared by reaction of tetraethoxy titanate with lactic acid in sufficient amounts to replace the ethoxy compounds and further complex the ester that is formed.

These materials may be applied from water solution onto the glass fibers in forming or after the original size has been removed from the glass fiber surfaces by chemical means or by heat treatment to weave set and relax the glass fibers when in the form of a textile fabric. The coatings which are applied to the glass fiber surfaces may be allowed to air dry or the materials may be set on the glass fiber surfaces more rapidly by heat treatment at temperatures up to about 250° F.

The exact character or construction of the complex formed has not been determined. It is known, however, that the compositions containing the complex, when applied to the glass fiber surfaces, develop a strong bonding relation and appear to become a permanent part of the glass fibers. When the amine or the alcohol of the complex is of high molecular weight, such increased abrasion resistance and improvement in the dirt releasing properties from the fiber surfaces is secured as render the compositions described herein capable of use markedly to improve such properties in other natural and synthetic fibers as previously described including wool, cotton, jute, nylon, Vinyon, Dynel, Dacron, Orlon, rayon and the like.

It has been found further that polymers such as polyvinyl alcohol and polyvinylpyrollidone may be insolubilized on the fiber surfaces by reaction with quaternary amine compounds to enable the development of new and improved finishes on glass fibers and on the surfaces of other fibers of the types described. While such insolubilized compounds provide improvement when used as a size for the glass fiber surfaces or on the surfaces of other fibers, greatest improvement and best results are secured from such compounds when used as a finish for the fibers and in which coloring agents may be embodied or later applied to develop a permanent color on some such surfaces as glass fibers which have been heretofore most difficult to process.

While best results are secured when the quaternary ammonium compounds are used as an agent for insolubilizing the titanium complexes previously described, the cationic amine compounds may also be used to insolubilize resinous polymers such as polyvinyl alcohol and polyvinyl pyrollidone by reactions independent of its presence as a component of a titanium complex. However, in the absence of the complex, it is desirable to make use of an acid, such as acetic acid, to stabilize the composition until insolubilization by reaction with the cationic amine upon drying.

It is believed that the reaction which is secured is by way of formation of a polyether-oxime resin which is formed in situ on the fiber surfaces and which permanently adheres to the fibers through primary valence linkages. Improvement in the bonding relation is achieved when the polymer is present as the complexing material with the titanium ester but a bonding relation can be established by the use of independent anchoring agents such as titanium complexes described as a separate component or by the use of the organo silicon compounds or Werner complex compounds of the types previously described.

As the quaternary amine compound, use may be made of such commercial materials as "Sapamine WL," marketed by Ciba Products, or "Ampitol 35D," marketed by Dexter Chemical Company, which represent compounds in which one of the amine groups of ethylene diamine is reacted with a fatty acid to form a fatty amide while the other is made tertiary by reaction with an alkyl compound. Use may also be made of cationic compounds in the form of imidazolene derivatives solubilized with acetic acid or tetraethylene pentamine reacted with acetic acid, or dicocodiamines, marketed by Armour & Company, or "Hyamine 1622" marketed by the Rohm & Haas Company. It is believed that the reaction which occurs between the hydroxy resin and the amine comprises splitting of the compound between the amine and the fatty acid group, particularly in the presence of inorganic acids or other acids followed by coordination of the basic nitrogen atom with the polymer.

The following are representative of compounds embodying this further feature of this invention:

Example 5

4.0 percent by weight polyvinyl alcohol (51–05)
1.3 percent by weight titanium lactate
2.0 percent by weight Nopcogen 16–L (Nopco Chemical Company) (sulphated fatty acid ester)
92.7 percent by weight water
4 cc. acetic acid (per 100)

Example 6

3.0 percent by weight polyvinyl pyrollidone
1.5 percent by weight vinylethoxy stearate
1.0 percent by weight tetraethylene pentamine reacted with acetic acid (wetting agent)
94.5 percent by weight water
3 cc. acetic acid (per 100)

Example 7

2.5 percent by weight polyvinyl alcohol
4.0 percent by weight Sapamine WL
0.5 percent by weight stearato chromic chloride
0.5 percent by weight hydrochloric acid
92.5 percent by weight water

Example 8

5.0 percent by weight polyvinyl alcohol
4.0 percent by weight dicocodiamine
91.0 percent by weight water
Small amount of acetic acid for compatibility

Example 9

3.0 percent by weight polyvinyl alcohol
1.5 percent by weight titanium lactate
0.5 percent by weight acrylic chromic chloride
95.0 percent by weight water
3 cc. acetic acid (per 100)

The above compositions find excellent use as a finish for various fibers. For example, when the composition of Example 5 is applied to glass strands as they are being formed, glass strands after being twisted and plied give a flexure endurance of about three times normal and an abrasion resistance which is about twice normal.

It will be apparent that we have provided a new and improved system which may be used in the treatment of glass fibers and other fibers to improve the characteristics thereof, to provide improved processing and performance characteristics and markedly to improve the abrasion resistance and the dirt releasing properties when applied as a finish to glass fibers, to natural fibers and to synthetic organic fibers.

It will be understood that modifications and substitutions of various compounds within the scope of the invention described may be made without departing from the spirit of the invention, especially as defined in the following claims.

We claim:
1. Glass fibers having a coating formed as a complex directly on the glass fiber surfaces comprising a titanium ester complexed with polyvinyl alcohol.
2. Glass fibers having a coating formed as a complex directly on the glass fiber surfaces comprising a titanium ester complexed with polyvinyl pyrollidone.
3. A composition for use in the treatment of fibers comprising an aqueous system containing a complex compound in the form of a titanium ester complexed with polyvinyl alcohol.
4. A composition for use in the treatment of fibers comprising an aqueous system containing a complex compound in the form of a titanium ester complexed with polyvinyl pyrollidone.
5. Glass fibers having a coating formed as a complex directly on the glass fiber surfaces comprising a complex compound in the form of a titanium ester complexed and insolubilized with a cationic quaternary amine compound.

References Cited in the file of this patent

UNITED STATES PATENTS

| | | |
|---|---|---|
| 2,527,328 | Powers et al. | Oct. 24, 1950 |
| 2,552,910 | Steinman | May 15, 1951 |
| 2,566,363 | Pedlow | Sept. 4, 1951 |
| 2,643,262 | Bostwick | June 23, 1953 |
| 2,666,772 | Boyd | Jan. 19, 1954 |
| 2,680,108 | Schmidt | June 1, 1954 |
| 2,710,267 | Boyd | June 7, 1955 |
| 2,710,268 | Bump | June 7, 1955 |
| 2,824,114 | Bostwick | Feb. 18, 1958 |
| 2,824,115 | Beacham et al. | Feb. 18, 1958 |

OTHER REFERENCES

Reprint Journal of American Chemical Society, 76, 2533–2536 (1954), Reeves et al., presented December 1953.